United States Patent
Prock et al.

[11] Patent Number: 5,816,713
[45] Date of Patent: Oct. 6, 1998

[54] BEARING CAGE WITH T-SHAPED PITOLING PADS

[75] Inventors: David M. Prock, Torrington; John S. Hayward, Harwinton; Christopher Senger, Torrington, all of Conn.

[73] Assignee: The Torrington Company, Torrington, Conn.

[21] Appl. No.: 697,938

[22] Filed: Sep. 3, 1996

[51] Int. Cl.[6] ............... F16C 33/46; F16C 33/48; F16C 19/00
[52] U.S. Cl. ............... 384/580; 384/470; 384/572
[58] Field of Search ............... 384/572, 577, 384/580, 470, 474

[56] References Cited

U.S. PATENT DOCUMENTS

| | | | |
|---|---|---|---|
| 3,597,031 | 8/1971 | Bill | 384/470 |
| 3,628,839 | 12/1971 | Vanest | 384/470 |
| 4,073,552 | 2/1978 | Christy | 384/470 |
| 4,541,743 | 9/1985 | Hatano . | |
| 4,874,260 | 10/1989 | Podhajecki . | |
| 4,881,830 | 11/1989 | Shepard et al. | 384/572 X |
| 5,026,179 | 6/1991 | Ito | 384/580 |
| 5,033,878 | 7/1991 | Tsugi et al. | 384/580 |
| 5,263,779 | 11/1993 | Sakaguchi et al. | 384/470 |
| 5,328,277 | 7/1994 | Moulton | 384/470 |
| 5,391,005 | 2/1995 | Alling | 384/580 |
| 5,575,733 | 11/1996 | Machida et al. | 384/470 |

Primary Examiner—Charles A. Marmor
Assistant Examiner—Matthew A. Kaness
Attorney, Agent, or Firm—John C. Bigler

[57] ABSTRACT

Two end rims are spaced along a common axis and are connected by crossbars such that elongated pockets are formed for rollers. Piloting pads extend axially along the crossbars and a portion of the end rims and extend circumferentially along a portion of the ends of the roller pockets. A radially outward surface of the end rims is recessed with respect to the piloting pads and provides a lubrication channel connecting the roller pockets.

13 Claims, 1 Drawing Sheet

BEARING CAGE WITH T-SHAPED PITOLING PADS

BACKGROUND OF THE INVENTION

This invention relates generally to bearing cages for use with roller bearings and, more particularly, to a polymer bearing cage suitable for applications imposing high limited lubrication temperatures and severe loads.

Crankpin bearing conditions within two- and four-cycle internal combustion engines and automotive transmission planetary set bearing conditions are among the most severe. Loads, speeds, accelerations, lubrication, shaft slope, and temperatures make bearing selection critical. Needle roller and cage assemblies have found general acceptance as an optimum choice for meeting those extreme requirements.

Typically, such bearings utilize a strong, hardened cage formed or machined of steel, silver plated, and staked to retain the rollers. In less demanding applications, bearing cages for roller bearings have been made of various polymers to minimize weight and reduce manufacturing cost. However, such polymer bearing cages have not been successful in severe applications because they lack sufficient strength and/or prevent adequate lubricant flow.

The foregoing illustrates limitations known to exist in present cages for roller bearings. Thus, it is apparent that it would be advantageous to provide an alternative directed to overcoming one of more of the limitations set forth above. Accordingly, a suitable alternative is provided including features more fully disclosed hereinafter.

SUMMARY OF THE INVENTION

In one aspect of the present invention, this is accomplished by providing a bearing cage comprising first and second annular end rims spaced along a common axis and crossbars connecting the end rims such that elongated roller pockets are formed between the end rims and the crossbars. The end rims and crossbars have radially outward T-shaped piloting pads extending axially along the crossbars and a portion of the end rims and extending circumferentially along a portion of ends of the roller pockets. A remaining radially outward surface of the end rims is recessed and provides a lubrication channel connecting the roller pockets.

The foregoing and other aspects will become apparent from the following detailed description of the invention when considered in conjunction with the accompanying drawing figures.

BRIEF DESCRIPTION OF THE DRAWING FIGURES

FIG. 1 is a pictorial view illustrating an embodiment of the bearing cage of the present invention; and FIG. 2 is an enlarged sectional view of the embodiment of the bearing cage of FIG. 1 taken along the line 2—2 of FIG. 1, showing a portion of an outer bearing raceway.

DETAILED DESCRIPTION

Figure 1:
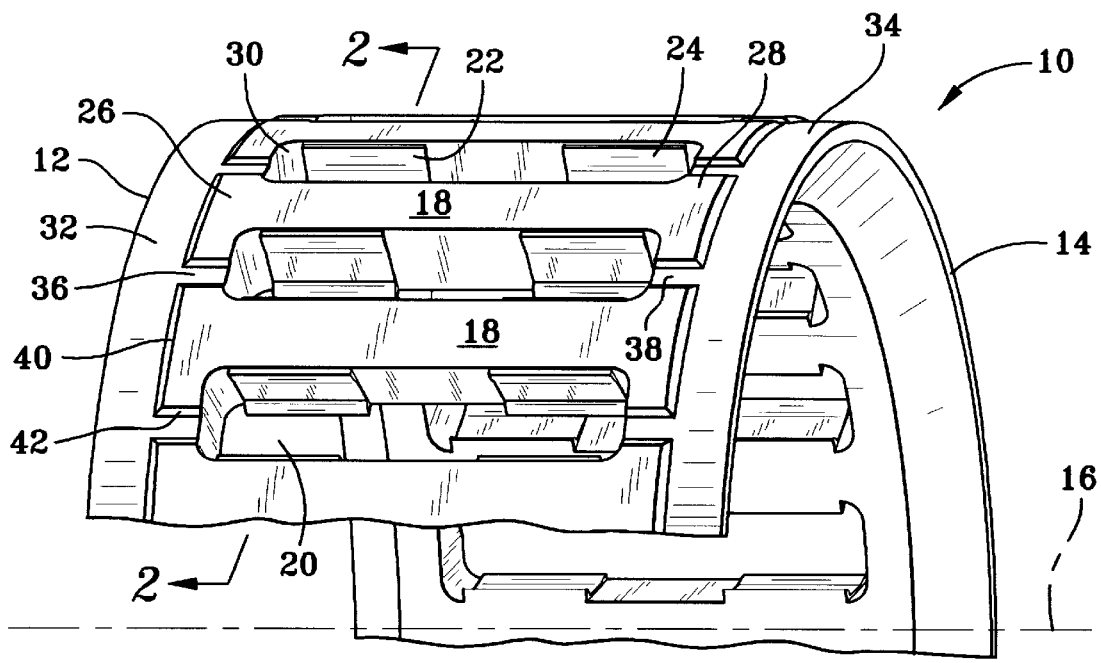

Referring now to the drawings, FIG. 1 illustrates bearing cage 10, with first and second annular end rims 12 and 14 axially spaced along common axis 16. Crossbars 18 connect end rims 12 and 14 such that elongated roller pockets 20 are formed between the end rims and the crossbars for retaining rollers 21, indicated in FIG. 2. Retention pads 22 and 24 restrain the rollers radially, as described below.

End rims 12 and 14 and crossbars 18 are configured with radially outwardly directed T-shaped piloting pads 26 and 28. The stem of the "T" of the pads extends axially along the crossbars and a portion of the end rims, and the branches of the "T" of the pads extend circumferentially along a portion of the ends of the adjacent roller pockets. Pockets 20 are formed with rounded corners 30 to reduce stress and are strengthened by the piloting pads that wrap around rounded corners 30.

Preferably, T-shaped piloting pads 26 and 28 are joined to form an "I" configuration, as illustrated in FIG. 1. Alternatively, a recess could be provided between T-shaped piloting pads 26 and 28, allowing lubricant to flow between adjacent roller pockets.

Bearing cage 10 may be formed as a full round cage to wrap completely around a shaft as a single continuous piece. Alternatively, bearing cage 10 may be a split full round cage, allowing the cage to spread over a shaft. Additionally, bearing cage 10 a crescent-shaped segment, allowing the bearing cage to be positioned laterally against a raceway. The crescent-shaped segment may in combination with other segments to provide a multi-piece full round cage or may be used alone in an oscillating bearing.

A radially outward surface of end rims 12 and 14 that is not covered by the piloting pads is recessed and provides annular lubrication channels 32 and 34 along the axially outer portions of end rims 12 and 14. Axially extending lubrication channels 36 and 38, between adjacent T-shaped piloting pads 26 and 28, allow lubricant to flow through annular lubrication channels 32 and 34 to each roller. Chamfered surfaces 40 and 42 separate the lubrication channels from the piloting pads and promote the formation of a piloting lube film.

Figure 2:
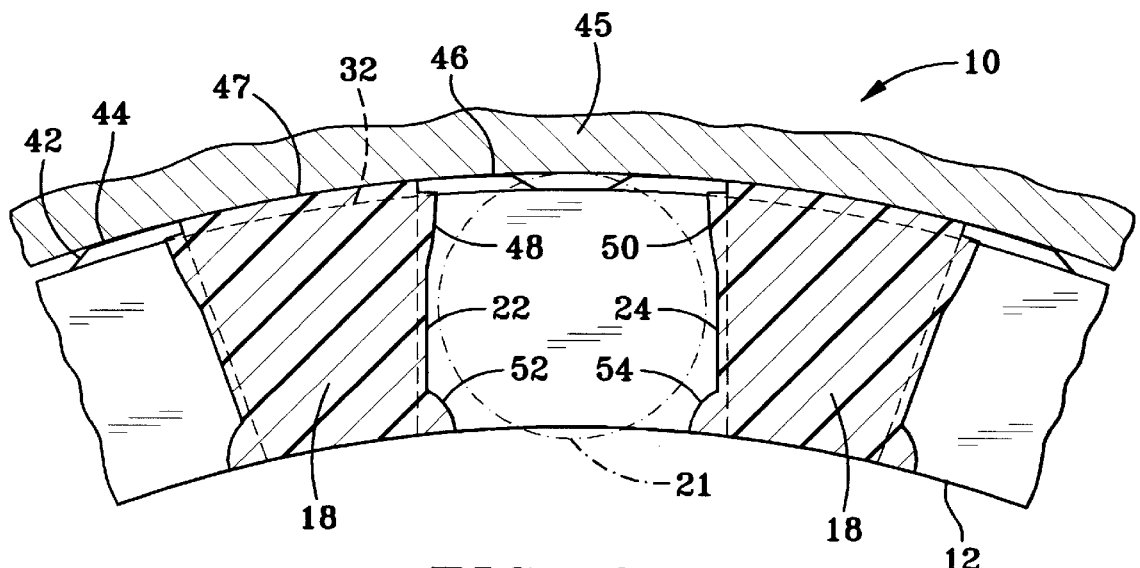

Preferably, the branches of T-shaped piloting pads 26 and 28 are tapered to form sloping ramps 44 and 46, as shown in FIG. 2. During operation, sloping ramps 44 cooperate with chamfered surfaces 40 and 42 to direct lubricant into a film between the piloting pads and outer raceway of a bearing or component 45. To further enhance the formation of this film of lubricant, the piloting pads may have a central cylindrical surface 47, aligned with crossbars 18, with a radius less than that of bearing cage 10 to provide a "crown".

FIG. 2 also illustrates a preferred configuration of retention pads 22 and 24. Radially outer ramp surfaces 48 and 50 narrow the opening of roller pockets 20 to prevent radially outward movement of rollers 21, and radially inner cylindrical surfaces 52 and 54 narrow the roller pocket opening to prevent radially inward movement of rollers 21. Resiliency of bearing cage 10 allows rollers 21 to be inserted into the roller pockets.

Bearing cage 10 may be formed of various materials, including steel, bronze or other metals, with or without silver plating or other coatings. However, a particular advantage of the present invention is that the configuration allows the bearing cage to be made of polymer, resulting in advantages of weight and manufacturing cost. A preferred material is glass fiber reinforced polyetheretherketone (PEEK), due to that polymer's high strength and stability at high temperatures. Other polymers with suitable properties may also be used to form the bearing cage of the present invention.

Because the piloting surface of the present invention is less than the full axial length of the bearing cage, lubricant is free to reach the lubrication channels even if the piloting surface wears into the outer raceway. The relief in the end rims at the ends of the roller pockets ensures that the lubricant reach the rollers. In contrast, wear with prior art designs may result in labyrinth-like seals that prevent the lubricant from reaching the rollers.

From the above description, it should be apparent that the present invention provides a polymer bearing cage with increased strength and improved lubricant flow, suitable for severe applications. In addition, the piloting pads of the present invention reinforce the crossbars such that moment loads (twisting of the crossbars about a longitudinal axis) associated with cage piloting are supported by the end rim and crossbar rather than just the crossbar. This reduces corner stresses at the ends of the roller pocket.

Having described the invention, what is claimed is:

1. A bearing cage for a roller bearing, the bearing cage comprising:

first and second annular end rims spaced along a common axis; and crossbars connecting the end rims such that elongated roller pockets are formed between the end rims and the crossbars;

the end rims and crossbars being configured with radially outward T-shaped piloting pads for guiding the bearing cage, the piloting pads extending axially along the crossbars and a portion of the end rims and extending circumferentially along a portion of ends of the roller pockets, such that a remaining radially outward surface of the end rims is recessed with respect to the piloting pads, the recessed surface extending circumferentially, axially outward of the T-shaped piloting pads, and extending axially, between the T-shaped piloting pads to the ends of the roller pockets, thereby providing a lubrication channel connecting the roller pockets.

2. The bearing cage according to claim 1, wherein the T-shaped piloting pads are joined to form I-shaped pads extending the full axial length of the crossbars.

3. The bearing cage according to claim 1, wherein the T-shaped piloting pads are sloped radially inwardly to form ramp surfaces.

4. The bearing cage according to claim 1, wherein the T-shaped piloting pads and lubrication channels are separated by chamfered surfaces.

5. The bearing cage according to claim 1, wherein the T-shaped piloting pads have a crowned central portion aligned with the crossbars.

6. The bearing cage according to claim 1, wherein the recessed surface of the end rims includes an annular channel at each axial end of the bearing cage.

7. The bearing cage according to claim 1, wherein the bearing cage is formed of a polymer.

8. The bearing cage according to claim 7, wherein the polymer is reinforced with fibers.

9. The bearing cage according to claim 7, wherein the polymer is fiber reinforced polyetheretherketone.

10. The bearing cage according to claim 1, wherein the bearing cage comprises a full round configuration.

11. The bearing cage according to claim 10, wherein the full round configuration includes a slit such that the cage may be spread over a shaft.

12. The bearing cage according to claim 1, wherein the bearing cage comprises a segment of a full round configuration such that the bearing cage may be positioned laterally over a raceway.

13. The bearing cage according to claim 1, wherein the bearing cage is made of steel and has a surface layer of silver.

* * * * *

UNITED STATES PATENT AND TRADEMARK OFFICE
CERTIFICATE OF CORRECTION

PATENT NO. : 5,816,713
DATED : October 6, 1998
INVENTOR(S) : David M. Prock, et. al.

It is certified that error appears in the above-identified patent and that said Letters Patent is hereby corrected as shown below:

Title page, item [54] and col. 1, lines 1-2, should read --
Bearing Cage with T-Shaped Piloting Pads--

Signed and Sealed this

Twelfth Day of January, 1999

Attest:

*Attesting Officer*  *Acting Commissioner of Patents and Trademarks*